Feb. 19, 1963  J. L. THOMAS  3,078,410
SHORT CIRCUIT PROTECTION DEVICE
Filed Sept. 22, 1959
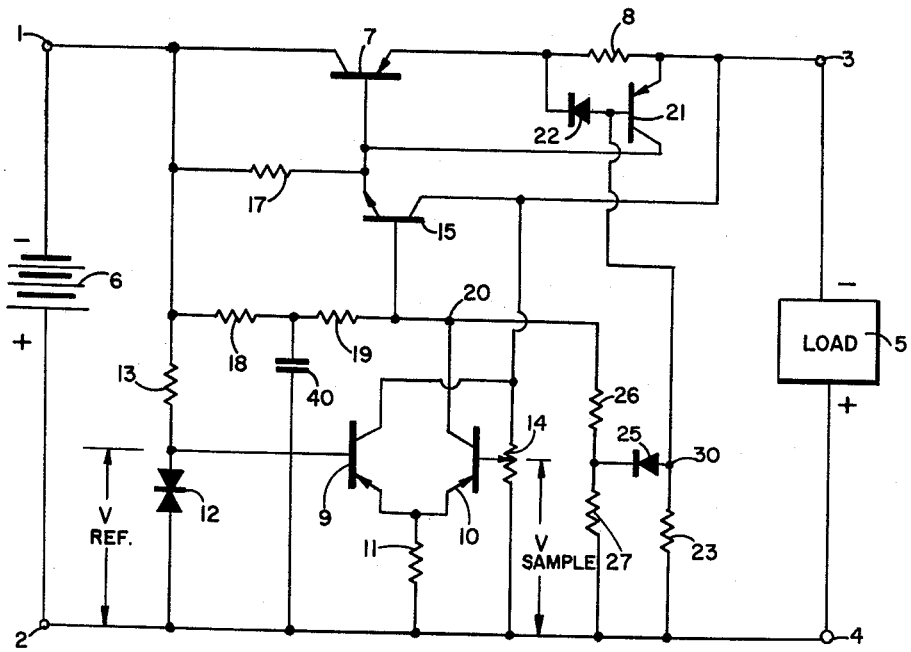
INVENTOR.
JAMES L. THOMAS
BY
AGENT 3,078,410
Patented Feb. 19, 1963

3,078,410
SHORT CIRCUIT PROTECTION DEVICE
James L. Thomas, La Habra, Calif., assignor to
North American Aviation, Inc.
Filed Sept. 22, 1959, Ser. No. 841,621
8 Claims. (Cl. 323—22)

This invention relates to transistorized regulation protection circuits and more particularly to a circuit responsive to overload currents and low voltages through a load for protecting sensitive elements from overload currents and short circuits and is particularly adaptable for adjustable voltage power supply circuits.

Semiconductor devices, such as transistors, commonly used in voltage regulated power supplies, have short thermal time constants. High currents and voltages occurring in semiconductor elements of a transistorized power supply upon overloads or short circuits are extremely damaging. In a typical voltage regulated power supply circuit wherein a power transistor is included in series between a source and a load and associated circuity maintains a constant voltage across the load, a short circuit occurring across the load or in related circuitry immediately results in an excessive current flowing through the series supply transistor. To compensate for this current, means must be provided in the voltage regulation circuit to limit the current. In order to allow proper current limiting, the normal voltage regulation action ceases upon a short circuit, with the voltage regulator operating as a constant current supply no longer regulating the voltage across the load. At the same time the current through the short circuit rises, the voltage across the short circuit falls rapidly. The power transistor must now dissipate the voltage between the source and the load, with the load voltage being effectively zero. Thus, the excessive voltage drop across the power transistor causes excessive heat and tends to break down the transistor.

Transistor short circuit protection devices of the prior art have been designed to protect transistor elements by limiting the voltage and current to predetermined maximum values. Such circuits provide no protection from the inherent low voltage in a short circuit. This low voltage results in an excessive voltage drop and power dissipation across the series supply transistor which seriously damages the transistor. Additionally, short circuit protection circuits designed to fully protect semiconductor elements therein are severely limited in their operation. Such circuits work for a given value of voltage from the power supply and are not adaptable to varying voltages from the power supply.

The device of this invention provides complete protection to transistors in a variable voltage power supply circuit by providing means for cutting off the supply of voltage from the source to the load upon occurrence of an overload current or short circuit across the load. Fast acting current and voltage responsive circuits automatically open the supply circuit upon occurrence of an overload current across the load. The protection circuit of this invention is not dependent on a constant voltage power supply but is readily adaptable to adjustable voltage power supplies.

It is therefore an object of this invention to provide a short circuit protection device for semiconductor elements in a voltage regulated power supply.

It is another object of this invention to provide an improved current protection device adapted to adjustable voltage power supplies.

It is still another object of this invention to provide a fast acting electronic switch for opening a current supply circuit to a load when the voltage across the load falls below a predetermined value.

It is a still further object of this invention to provide an overload current and under voltage protection circuit independent of the input supply voltage.

Other objects will become apparent from the following description taken in connection with a single FIGURE which is a schematic diagram of the circuit embodying this invention.

Briefly, according to the preferred embodiment of this invention, an overload protection circuit is provided in a regulated power supply to disconnect the source from the load when an overload occurs. A signal translating device for supplying current from a source to a load is controlled by voltage regulating means to maintain a constant potential across the load. The regulating means presents a controlling voltage to the signal translating device which is representative of the difference between a reference voltage and a voltage sampled from the load voltage. Additionally, a current responsive circuit responsive to an increase in load current is provided to present a control current to the signal translating device for decreasing the supply current when the current through the load reaches a predetermined maximum value. A voltage responsive circuit is provided which is responsive to a decrease in the control voltage from the regulating means operating to increase the control current from the current responsive circuit. The combination of the current responsive circuit and the voltage responsive circuit operates to cut off the current supply circuit upon occurrence of an overload or short circuit.

Referring more particularly to the single FIGURE, there is illustrated input terminals 1 and 2 to a transistorized power supply circuit which supplies regulated current to output terminals 3 and 4 connected across a load 5. Input terminals 1 and 2 are responsive to a direct-current source such as, for example, battery 6, or a source of D.-C. voltage whose output may be variable, with terminal 2 connected to the plus side and terminal 1 connected to the minus side thereof. Signal translating device 7, illustrated in the preferred embodiment as a series power transistor of the PNP type, is connected in series between source 6 and load 5. The collector of transistor 7 is connected to the minus side of source 6 and the emitter is connected through current limiting resistor 8 to the minus side of load 5. Regulation of the voltage across load 5 is provided by a differential amplifier circuit comprising PNP transistors 9 and 10 responsive to a sampled voltage of load 5 and presenting an output voltage which controls the base of transistor 7 in order to maintain a constant voltage across load 5. More specifically, transistors 9 and 10 have their emitters connected in common through resistor 11 to the plus sides of source 6 and load 5. A constant voltage reference is provided for transistor 9 by voltage reference 12 which may be, for example, a zener diode which is connected between the base of transistor 9 and the plus side of source 6. Resistor 13 is also connected in common to the base of transistor 9 and voltage reference 12 and has its other side connected to the minus side of source 6. Resistor 14 is connected across load 5 to sample the voltage thereof. A wiper is connected to an intermediate point of resistor 14 and also to the base of transistor 10. The collector of transistor 9 is connected to the minus side of load 5, and the collector of transistor 10 is connected to point 20. Transistors 9 and 10 operate to compare the reference voltage between the base and emitter of transistor 9 and the sampled voltage between the base and emitter of transistor 10, presenting an output voltage at point 20 of the collector of transistor 10 which is indicative of the difference between the reference voltage and the voltage across load 5. The difference voltage presented at point 20 is an inversion of the difference between the sampled and reference voltage.

Point 20 of the output of the differential amplifier is connected to the base of emitter-follower amplifier 15 illustrated as an NPN transistor having its emitter connected through resistor 17 to the minus side of source 6 and also to the base of transistor 7. The collector of transistor 15 is connected to the minus side of load 5 to complete the circuit. Resistors 18 and 19 connect the base of transistor 15 to the minus side of source 6 to complete the circuit for the base current of transistor 15. Capacitor 40 is connected between the intermediate point of resistors 18 and 19 and the plus side of source 6 to provide stability of the circuit.

In operation of the voltage regulation circuit a change in voltage across load 5 from the predetermined reference voltage is sampled at the base of transistor 10. For example, a decrease in the magnitude of the load voltage causes a corresponding decrease in sampled voltage at the base of transistor 10. The voltage at point 20 at the collector of transistor 10 decreases and the collector current correspondingly decreases. The decrease in voltage and current at point 20 causes a corresponding decrease in base current and voltage of transistor 15. The emitter current of transistor 15 correspondingly decreases thereby increasing the current in the base of transistor 7. An increase in current in the base of transistor 7 causes a corresponding increase in the supply current from source 6 to load 5 flowing through the emitter-collector circuit of transistor 7, thereby raising the voltage across load 5, maintaining a constant potential equal to the reference voltage. Similarly, when the voltage across load 5 rises above the reference voltage the differential amplifier circuit, cooperating with the emitter-follower amplifier, controls transistor 7 to reduce the voltage to the reference value. Temperature compensation is obtained by having a differential amplifier to compare the reference voltage with the sampled voltage. It is to be noted that any other form of voltage regulation could be applied in the circuit.

The voltage regulation of the power supply circuit so far described maintains a constant potential across load 5 for normal operation. While the circuit described is affected for normal changes in voltage, a rapid change in voltage and current across load 5 due to an overload or short circuit cannot be compensated for by the regulating circuit fast enough to fully protect the semiconductor elements in the circuit. In order to provide proper short circuit and overload protection, a current responsive circuit is provided which is responsive to an increase in current through load 5 to present a control current to transistor 7 to decrease the supply current from source 6. A voltage responsive circuit responsive to a decrease in the output control voltage at point 20 of the differential amplifier operates to increase the control current provided by the current responsive circuit. The current responsive circuit comprises transistor 21 of the PNP type having its emitter connected to minus terminal 3 and its collector connected in common with the base of transistor 7 and the emitter of transistor 15. The base of transistor 21 is connected through voltage reference means 22 to the emitter of transistor 7. Reference means 22 may be, for example, a silicon diode stabistor having its cathode connected in common with the emitter of transistor 7 and one side of resistor 8 and its anode connected in common with the base of transistor 21 and point 30 through resistor 23 to plus terminal 4. Diode 22 has a closely defined forward voltage drop from its anode to its cathode which provides a reference bias potential on the base of transistor 21 which is greater than the potential on the emitter of transistor 21 for normal operation. Thus, transistor 21 is normally cut off as long as the voltage across load 5 is being properly regulated by the regulation circuit described above.

Transistor 21 is responsive to an increase in load current above a reference value. When resistor 8 samples the increased current, the voltage across resistor 8 rises and becomes greater than the reference voltage across diode 22, causing transistor 21 to conduct. The current path from the collector of transistor 21 through resistor 17 to minus terminal 1 removes some of the base current from transistor 7, lowering the current through the collector-emitter thereof and in turn lowering the current being supplied to load 5.

The voltage responsive circuit comprises diode means 25 having its anode connected to point 30 and its cathode connected to the midpoint of resistors 26 and 27 which are connected between point 20 and plus terminal 4 to provide a voltage division circuit. Diode 25 has an abruptly increasing current voltage characteristic establishing a reference voltage between point 30 and point 20. Diode 25 operates as a switch, conducting if the voltage at the junction of resistors 26 and 27 is more negative than the voltage at point 30. The voltage at the junction of resistors 26 and 27 is in turn directly dependent on the voltage at point 20. Thus, diode 25 conducts when the voltage at point 20 reaches a predetermined negative value with respect to the voltage at point 30. Conduction of diode 25 increases the flow of base current in transistor 21, thereby further biasing the base with respect to the emitter, increasing the current flow through the emitter-collector circuit of transistor 21. This in turn further decreases the base current in transistor 7, eventually operating to cut off the current supply from source 6 to load 5.

In operation of the overcurrent and short circuit protection circuit it will be assumed that a slowly increasing current load across load 5 is occurring. As long as the current through load 5, sampled by resistor 8, is less than the maximum allowable load current determined by diode 22, the normal voltage regulation action occurs. Transistor 21 is cut off and diode 25 is cut off. The base emitter voltage drops of transistor 7 and transistor 15 are small and in an opposite direction because of the fact that transistor 7 is of the PNP type and transistor 15 is of the NPN type. The voltage at the collector of transistor 10 (point 20) is very close to the output voltage at minus terminal 3. The voltage at the junction of resistors 26 and 27 is less negative than the output voltage due to the divider action of resistors 26 and 27 maintaining diode 25 cut off. When the slowly increasing current through load 5 rises above the maximum value, the voltage drop across resistor 8 becomes greater than the reference voltage across diode 22 thereby biasing the base of transistor 21, negative with respect to its emitter, and transistor 21 commences conduction. The conduction of transistor 21 removes some of the base current from transistor 7 causing a decrease in flow of current through the collector-emitter circuit of transistor 7, thereby causing the voltage across load 5 to drop slightly. When the output voltage across load 5 drops, the differential amplifier senses the drop, amplifies it and inverts it, and presents a negative control signal at point 20. The floor of current in emitter 15 decreases proportionately, tending to raise the flow of current in the base of transistor 7. Thus, the regulator circuit is attempting to increase the base current of transistor 7 to increase the flow of current through load 5 to compensate for the drop in voltage across load 5. However, this action is ineffective since the base of transistor 7 is also being controlled by the current responsive circuitry of transistor 21, and the voltage regulation of transistor 7 ceases to maintain the voltage constant across load 5. Thus, the control signal presented to the base of transistor 7 by transistor 21 is a positive control signal (180 degrees out of phase with respect to the signal presented by transistor 15) tending to reduce conduction in the collector-emitter circuit of transistor 7 and overrides the negative control signal presented by transistor 15 from the voltage regulation circuit which attempts to cause an increase in flow of current through the collector-emitter circuit of transistor 7.

Since the base of transistor 7 is now being controlled by the current limiting action of transistor 21, transistor 15 cuts off causing point 20 to fall further toward the minus value of D.-C. source 6. The negative surge of voltage at point 20 reduces the voltage at the junction of resistors 26 and 27 below the reference established by diode 25 causing diode 25 to conduct. Point 30 correspondingly falls in voltage, causing a further drop in voltage at the base of transistor 21. Transistor 21 increases in flow of current, presenting a more positive control signal to the base of transistor 7, tending to decrease the flow of current through the collector-emitter circuit of transistor 7. The action is regenerative and continues until transistor 21 is completely saturated and transistor 7 is completely cut off. The output voltage across load 5 immediately drops to zero.

As shown in the preferred embodiment of the invention, transistor 7 is of the PNP type and transistor 15 is of the NPN type. It is to be understood, however, that other combinations of PNP and NPN transistors may be used in the device by means well known in the art. As long as the signal presented by transistor 15 to the base of transistor 7 is a negative signal when the load voltage falls below the predetermined value and the signal presented to the base of transistor 7 by transistor 21 is a positive control signal when the load voltage decreases, the circuit operates to cut off transistor 7.

The embodiment disclosed shows an overload and short circuit protection circuit as applied to a voltage regulated power supply. Various other applications of the protection principles illustrated are readily apparent. Sensitive electrical semiconductor elements may be completely protected without affecting their accuracy by the insertion of the short circuit protection circuit in a manner similar to that described for the power supply circuit in the drawing.

The short circuit and overload protection circuit described is not dependent on the value of the output voltage and works equally well for variable voltage power supplies. The operation of diode 25, which acts as a switch sensitive to changes in voltage between point 20 and 30, is not dependent on the reference voltage established by diode 12. Diode 25 conducts when the output voltage of the differential amplifier at point 20 falls below the voltage established by diode 25. The voltage at point 20 is representative of a change of the difference in voltage between the load voltage and the reference voltage but is not representative of the reference voltage. For this reason a variable voltage power supply may be utilized.

Although this invention has been described and illustrated in detail, it is to be clearly understood that the same is by way of illustration and example only and is not to be taken by way of limitation, the spirit and scope of this invention being limited only by the terms of the appended claims.

I claim:

1. In a circuit adapted to protect a signal translating transistor device against overload and having regulating means cooperating therewith for supplying current at constant voltage to a load from a source, said regulating means responsive to the voltage across said load to present a first control signal to said transistor device for controlling the voltage across said transistor device; a current responsive circuit responsive to load current to present a second control signal to said transistor device for controlling the current through said transistor device, and a voltage responsive circuit responsive to a change from a predetermined value in said first control signal for varying said second control signal.

2. In a circuit adapted to protect a signal translating transistor device against overload and having regulating means cooperating therewith for supplying current at constant voltage to a load from a source, said regulating means responsive to the voltage across said load to present a control signal to said transistor device for controlling the voltage across said transistor device; a current responsive circuit responsive to load current to present a control signal to said transistor device, and means responsive to the difference between the output of said regulating means and a predetermined value for controlling said current responsive circuit.

3. The combination recited in claim 2 wherein said means responsive to the difference is regeneratively coupled to control said current responsive circuit.

4. An overload protection circuit comprising a signal translating transistor device having a pair of output electrodes and a control electrode for supplying current to a load from a source, means for regulating the voltage across said load, said means comprising means for establishing a first reference voltage, means for sampling the voltage across said load, and comparison means responsive to said reference voltage and said sampled voltage for presenting an output voltage proportional to the difference between said first reference voltage and said sampled voltage, means for connecting said output voltage to said control electrode for controlling said signal translating device to maintain said load voltage constant at said reference voltage, means for establishing a second reference voltage including diode switch means having an abruptly increasing current-voltage characteristic, and means having an input responsive to said second reference voltage and said output voltage, and having an output connected to said control electrode for causing said transistor device to cease conducting when said second reference voltage exceeds said output voltage.

5. An overload protection circuit comprising a signal translating transistor having a pair of output electrodes and a control electrode for supplying current to a load from a source, means for regulating the voltage across said load, said means comprising means for establishing a first reference voltage, means for sampling the voltage across said load, and comparison means having an input responsive to said reference voltage and said sampled voltage for presenting an output voltage at an output proportional to the difference between said reference voltage and said sampled voltage, means for inverting said output voltage, means for connecting said inverted output voltage to said control electrode for controlling said signal transistor to maintain said load voltage constant at said reference voltage, current responsive circuit means having an input responsive to an increase in load current for presenting a control signal at an output to said control electrode for decreasing current flow in said signal transistor, said control signal being 180 degrees out of phase with reference to said output voltage, and means coupling the input of said current response means to the output of said comparison means, said coupling means being responsive to a decrease in said output voltage for increasing said control signal.

6. An overload protection circuit comprising a signal translating transistor having a pair of output electrodes and a control electrode for supplying current to a load from a source, means for regulating the voltage across said load, said means comprising means for establishing a first reference voltage, means for sampling the voltage across said load, and comparison means responsive to said reference voltage and said sampled voltage for presenting an output voltage proportional to the difference between said reference voltage and said sampled voltage, means for connecting said output voltage to said control electrode for controlling said signal transistor to maintain said load voltage constant at said reference voltage, a transistor having a control electrode and a pair of output electrodes, said output electrodes connected in parallel with said signal transistor between said source and said load, means responsive to the current through said load connected to the control electrode of said transistor for causing current flow through the output electrodes of said transistor, one of the output electrodes of said transistor connected to the control electrode of said signal transistor for decreasing current flow in said signal transistor, a diode connected between the control electrode of said transistor and the output of said comparison means, said diode responsive to a decrease in said output voltage to increase the current flow through the output electrodes of said transistor.

7. In a circuit adapted to protect a signal translating transistor device against overload, said transistor device having a control electrode and a pair of output electrodes for supplying current to a load from a source, regulating means responsive to the voltage across said load for presenting a first control signal to said control electrode to cause said transistor device to supply current at a constant potential to said load, a current responsive circuit responsive to an increase in load current for presenting a second control signal to said control electrode to cause said transistor device to decrease the supply of current to said load, said second control signal being 180 degrees out of phase with said first control signal, and a voltage responsive circuit responsive to a decrease in said first control signal for increasing said second control signal.

8. The combination recited in claim 7 wherein said voltage responsive circuit includes a diode switch operating to increase said second control signal when said first control signal has decreased to a predetermined value.

References Cited in the file of this patent

UNITED STATES PATENTS

| | | |
|---|---|---|
| 2,888,633 | Carter | May 26, 1959 |
| 2,904,742 | Chase | Sept. 15, 1959 |
| 2,915,693 | Harrison | Dec. 1, 1959 |
| 2,922,945 | Norris et al. | Jan. 26, 1960 |